Patented Mar. 1, 1938

2,109,514

UNITED STATES PATENT OFFICE 2,109,514

ARALKYL ETHERS OF DI-ALKYL PHENOLS

Edward M. Van Duzee and Shailer L. Bass, Midland, Mich., assignors to The Dow Chemical Company, Midland, Mich., a corporation of Michigan No Drawing. Application October 14, 1936,
Serial No. 105,516

16 Claims. (Cl. 260—150)

The present invention concerns a new class of compounds, namely, the aralkyl ethers of the dialkyl-phenols and their nuclear halogenated substitution products. The term "alkyl" as employed in the specification and claims of this application includes straight-chain, branched-chain, and cyclo-alkyl radicals.

We have prepared compounds of the aforementioned class, determined certain physical properties thereof, whereby they may be readily identified, and found that they are particularly useful as intermediates for the manufacture of pharmaceuticals, and as plasticizing agents for cellulose derivatives such as ethyl cellulose, cellulose acetate, etc. The invention then consists in the new products hereinafter fully described and particularly pointed out in the claims.

The new compounds can be prepared by treating the alkali metal salt of a dialkyl-phenol compound with an aralkyl halide.

For example, a dialkyl-phenol compound is added to an alcoholic solution of metallic sodium to form the corresponding alcoholic sodium phenolate solution. An aralkyl halide is then introduced slowly into said phenolate solution, maintained at its refluxing temperature, to form the desired ether product. The reaction mixture is then cooled and diluted with several volumes of water to precipitate the crude ether product, which may thereafter be recovered in any convenient manner, e. g. by extraction with an organic solvent, decantation, etc. The crude product so obtained is washed with water to remove inorganic halides therefrom, and purified by distillation or fractional crystallization to obtain the desired ether in a substantially pure form.

Our new compounds may also be obtained by reacting a dialkyl phenol compound with an aralkyl halide in the presence of an aqueous or aqueous-alcoholic solution of sodium hydroxide or other suitable alkali.

The following illustrative examples describe in detail the preparation of certain specific members of our new class of compounds, but are not to be construed as limiting the same.

Example 1

7.4 grams (0.32 mole) of metallic sodium was digested with 250 milliliters of absolute alcohol, and then 75 grams (0.32 mole) of 2.4-di-tertiary-amyl-phenol reacted with the resulting alcoholate solution to form an alcoholic solution of sodium 2.4-di-tertiaryamyl-phenolate. This phenolate solution was warmed to its refluxing temperature and 40.5 grams (0.32 mole) of benzyl chloride added thereto over a period of 30 minutes. Refluxing was continued thereafter for one hour under atmospheric pressure, after which the reaction mixture was cooled and diluted with approximately 3 volumes of water. A dark oil separated out of the aqueous alcoholic suspension and was extracted therefrom with benzene, washed with water to remove suspended sodium chloride, filtered, and the benzene removed by distillation at atmospheric pressure. The dark viscous residue obtained thereby was fractionally distilled under reduced pressure, whereby there was obtained 60.3 grams (0.186 mole) of the benzyl ether of 2.4-di-tertiaryamyl-phenol as a yellowish liquid boiling at 176° to 179° C. at 4 millimeters pressure and having a specific gravity of 0.979 at 20°/4° C.

Example 2

9.55 grams of metallic sodium and 78.9 grams (0.416 mole) of a mixture of the isomeric cyclohexyl-cresols were reacted in 250 milliliters of absolute alcohol to form the corresponding sodium-cyclohexyl-cresolate. 52.6 grams (0.416 mole) of benzyl chloride was thereafter reacted therewith as described in Example 1, the product being 66.5 grams (0.238) mole of the benzyl ether of cyclohexyl-cresol which is a substantially water-white liquid boiling at 192° to 197° C. at 4 millimeters pressure, and having a specific gravity of 1.036 at 20°/4° C.

Example 3

10.85 grams of metallic sodium, 77.2 grams (0.471 mole) of 2-methyl-4-tertiarybutyl-phenol, and 59.5 grams (0.471 mole) of benzyl chloride were reacted together as described in Example 1. Fractional distillation of the crude reaction mixture resulted in the isolation of 82 grams (0.338 mole) of the benzyl ether of 2-methyl-4-tertiary-butyl-phenol as a yellow-tinged viscous liquid having a boiling point of 164°–166° C. at 4 millimeters pressure, and a specific gravity of 0.998 at 20°/4° C.

Example 4

In a similar manner, 4.33 grams of metallic sodium, 33.5 grams (0.188 mole) of 2.5-di-isopropyl-phenol, and 23.8 grams (0.188 mole) of benzyl chloride were reacted together in 200 milliliters of absolute alcohol. The major product resulting from the reaction consisted in 28.1 grams (0.1044 mole) of the benzyl ether of 2.5-di-isopropyl-phenol which is a light yellow liquid boiling at 153°–155° C. at approximately 2 millimeters pressure and having a specific gravity of 0.989 at 20°/4° C.

*Example 5*

4.2 grams of metallic sodium, 44.0 grams (0.183 mole) of 2.4-di-tertiarybutyl-6-chloro-phenol, and 23.1 grams (0.183 mole) of benzyl chloride were reacted together in alcohol substantially as described in the foregoing examples. The resulting crude reaction product was fractionally distilled under reduced pressure, whereby there was obtained 34.5 grams (0.1043 mole) of a benzyl ether of 2.4-di-tertiarybutyl-6-chloro-phenol product as a light yellow solid freezing at approximately 33.6° C., and having a boiling point of 165°–171° C. at 1 millimeter pressure.

*Example 6*

14.3 grams of metallic sodium, 102 grams (0.621 mole) of 2-methyl-4-tertiarybutyl-phenol, and 100 grams (0.621 mole) of 4-chloro-benzyl chloride were reacted together as described in Example 1, the product being 130.2 grams (0.47 mole) of the 4-chloro-benzyl ether of 2-methyl-4-tertiarybutyl-phenol as a light yellow solid boiling at 166°–169° C. at 2 millimeters pressure, and having a freezing point of 64.4° C.

*Example 7*

11.5 grams of metallic sodium, 82.0 grams (0.5 mole) of 2-methyl-4-tertiarybutyl-phenol, and 92.5 grams (0.5 mole) of beta-phenyl-ethyl bromide were reacted together in the usual manner. Fractionation of the crude reaction product resulted in the isolation of 43.5 grams (0.162 mole) of the beta-phenyl-ethyl ether of 2-methyl-4-tertiarybutyl-phenol as a viscous yellow-tinged liquid boiling between 160° and 165° C. at 3 millimeters pressure and having a specific gravity of 0.991 at 20°/4° C.

In a similar manner other aralkyl ethers of dialkyl-phenol compounds may be prepared by substituting other aralkyl halides for those employed in the foregoing examples, e. g. 4-bromo-benzyl ether of 2-methyl-4-tertiaryhexyl-phenol, 3-chloro-benzyl ether of 2-tertiarybutyl-4-cyclohexyl-phenol, 2.4-di-chloro-benzyl ether of 2-normalbutyl-4-methyl-phenol, phenyl-octyl ether of 3-methyl-6-tertiaryamyl-phenol, phenyl-amyl ether of 2-normal-propyl-5-secondaryamyl-phenol, 4-iodo-phenyl-ethyl ether of 2-bromo-4-normalpropyl-6-octyl-phenol, etc. In place of the sodium phenolates employed in the above examples, other alcohol soluble metallic dialkyl-phenolates may be employed, e. g. the potassium compounds, etc.

The compounds to which this invention particularly relates have the following general formula:

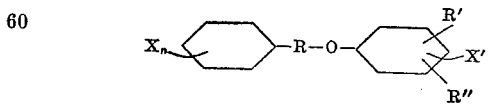

wherein X and X' each represent hydrogen or halogen, $n$ is an integer not greater than 2, R represents an alkylene radical, and R' and R'' represent the same or different alkyl groups, the sum of the carbon atoms of the two alkyl groups being at least 5.

This application is a continuation in part of our copending application, Serial No. 93,657, filed July 31, 1936.

Other modes of applying the principle of our invention may be employed instead of those explained, change being made as regards the materials employed, provided the products described in the following claims be thereby obtained.

We therefore particularly point out and distinctly claim as our invention:

1. An aralkyl ether of a dialkyl-phenol compound having the formula:

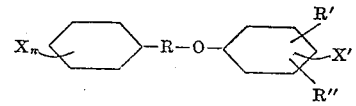

wherein X and X' each represent a member of the group consisting of halogen and hydrogen, $n$ is an integer not greater than 2, R represents an alkylene radical, and R' and R'' each represent an alkyl group, the sum of the carbon atoms of the two alkyl groups being at least 5.

2. An aralkyl ether of a dialkyl-phenol compound having the formula:

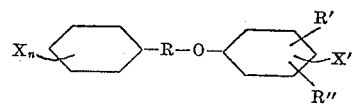

wherein X and X' each represent a member of the group consisting of halogen and hydrogen, $n$ is an integer not greater than 2, R represents an alkylene radical containing from 1 to 8 carbon atoms inclusive, and R' and R'' each represent an alkyl group, the sum of the carbon atoms of the two alkyl groups being at least 5.

3. An aralkyl ether of a dialkyl-phenol compound having the formula:

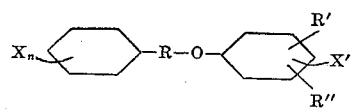

wherein X and X' each represent a member of the group consisting of halogen and hydrogen, $n$ is an integer not greater than 2, R represents an alkylene radical, and R' and R'' each represent an alkyl group containing from 1 to 8 carbon atoms inclusive, the sum of the carbon atoms of the two alkyl groups being at least 5.

4. An aralkyl ether of a dialkyl-phenol compound having the formula:

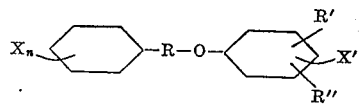

wherein X and X' each represent a member of the group consisting of halogen and hydrogen, $n$ is an integer not greater than 2, R represents an alkylene radical containing from 1 to 8 carbon atoms inclusive, and R' and R'' each represent an alkyl group containing from 1 to 8 carbon atoms inclusive, the sum of the carbon atoms of the two alkyl groups being at least 5.

5. An aralkyl ether of a dialkyl-phenol compound having the formula:

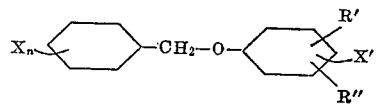

wherein X and X' each represent a member of the group consisting of halogen and hydrogen, $n$ is an integer not greater than 2, and R' and R'' each represent an alkyl group, the sum of the carbon atoms of the two alkyl groups being at least 5.

6. A chloro-benzyl-ether of a dialkyl-phenol compound having the formula:

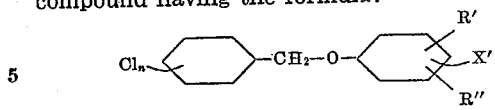

wherein X' represents a member of the group consisting of halogen and hydrogen, $n$ is an integer not greater than 2, and R' and R" each represent an alkyl group, the sum of the carbon atoms of the two alkyl groups being at least 5.

7. A benzyl ether of a dialkyl-phenol compound having the formula:

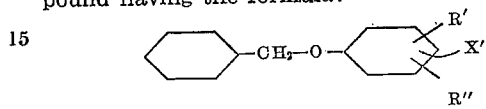

wherein X' represents a member of the group consisting of halogen and hydrogen, and R' and R" each represent an alkyl group, the sum of the carbon atoms of the two alkyl groups being at least 5.

8. An aralkyl ether of a dialkyl-chloro-phenol compound having the formula:

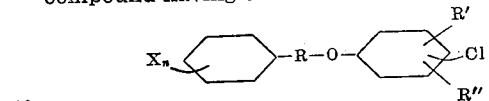

wherein X represents a member of the group consisting of halogen and hydrogen, $n$ is an integer not greater than 2, R represents an alkylene radical, and R' and R" each represent an alkyl group, the sum of the carbon atoms of the two alkyl groups being at least 5.

9. A benzyl ether of a dialkyl-chloro-phenol compound having the formula:

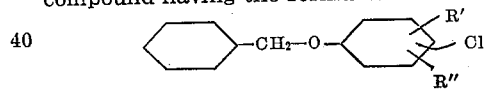

wherein R' and R" each represent an alkyl group, the sum of the carbon atoms of the two alkyl groups being at least 5.

10. A benzyl ether of a dialkyl-phenol having the formula:

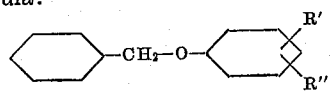

wherein R' and R" each represent an alkyl group, the sum of the carbon atoms of the two alkyl groups being at least 5.

11. An aralkyl ether of a 2.4-dialkyl-phenol having the formula:

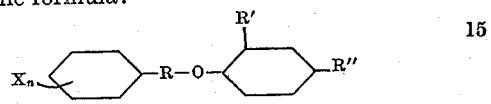

wherein X represents a member of the group consisting of halogen and hydrogen, $n$ is an integer not greater than 2, R represents an alkylene radical, and R' and R" each represent an alkyl group, the sum of the carbon atoms of the two alkyl groups being at least 5.

12. A benzyl ether of a 2.4-dialkyl-phenol compound having the formula:

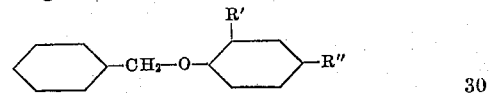

wherein R' and R" each represent an alkyl group, the sum of the carbon atoms of the two alkyl groups being at least 5.

13. A benzyl ether of a dialkyl-phenol compound, wherein the sum of the carbon atoms of the 2 alkyl groups is at least 5.

14. The benzyl ether of 2.4-di-tertiarybutyl-phenol.

15. The benzyl ether of 2.5-dialkyl-phenol.

16. The benzyl ether of 2.5-di-isopropyl-phenol.

EDWARD M. VAN DUZEE.
SHAILER L. BASS.